United States Patent
Maeda et al.

(10) Patent No.: US 8,096,242 B2
(45) Date of Patent: Jan. 17, 2012

(54) SQUIB, GAS GENERATOR FOR AIR BAG AND GAS GENERATOR FOR SEAT BELT PRETENSIONER

(75) Inventors: Shigeru Maeda, Himeji (JP); Hirotaka Mukunoki, Himeji (JP); Hideyuki Koike, Himeji (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 205 days.

(21) Appl. No.: 12/447,170

(22) PCT Filed: Oct. 26, 2007

(86) PCT No.: PCT/JP2007/070910
§ 371 (c)(1),
(2), (4) Date: Apr. 24, 2009

(87) PCT Pub. No.: WO2008/050860
PCT Pub. Date: May 2, 2008

(65) Prior Publication Data
US 2010/0018431 A1    Jan. 28, 2010

(30) Foreign Application Priority Data

Oct. 26, 2006  (JP) .................................. 2006-291301

(51) Int. Cl.
*F42B 3/10*    (2006.01)
*F42B 3/13*    (2006.01)
*B60R 21/264*  (2006.01)
*B60R 22/46*   (2006.01)

(52) U.S. Cl. ................... 102/202.7; 102/202.9; 102/530

(58) Field of Classification Search ............... 102/202.5, 102/202.12, 202.14, 202.7, 202.9, 530; 280/728.1; 361/248
See application file for complete search history.

(56) References Cited

U.S. PATENT DOCUMENTS
4,062,290 A * 12/1977 Mayer ........................... 102/206
(Continued)

FOREIGN PATENT DOCUMENTS
EP        1160533 B1    1/2002
(Continued)

OTHER PUBLICATIONS

International Search Report, PCT/JP2007/070914, dated Nov. 20, 2007.

(Continued)

*Primary Examiner* — Bret Hayes
(74) *Attorney, Agent, or Firm* — Allston L. Jones; David J. Aston; Peters Verny, LLP (57) ABSTRACT

A squib includes a cup body and a closure plug for holding a plurality of electrode pins insulated from one another and closing the opening of the cup body, and further includes, in the cup body, ignition powder and an ASIC component formed by molding a resin around electric circuits including an ASIC and a capacitor, a heating element connected to the ASIC and located at the top of the resin molding of the ASIC component, and connection electrodes located at the bottom of the resin molding for connecting the ASIC to the electrode pins. The squib includes a cylindrical metal fixture having at the center of its top an opening of a size sufficient to expose the heating element and being fixed to the closure plug in a state covering the top circumferential periphery and side surface of the ASIC component and pushing the connection electrode of the ASIC component against the electrode pins. With the squib thus constructed, electric current can be reliably supplied to the electric circuits incorporated in the squib, and upon operation of the squib the resin molding and its broken pieces are effectively prevented from flying in all directions.

6 Claims, 6 Drawing Sheets

U.S. PATENT DOCUMENTS

| | | | |
|---|---|---|---|
| 4,307,663 A * | 12/1981 | Stonestrom | 102/202.4 |
| 4,422,381 A * | 12/1983 | Barrett | 102/202.2 |
| 5,544,585 A | 8/1996 | Duguet | |
| 5,861,570 A | 1/1999 | Bickes et al. | |
| 5,912,427 A | 6/1999 | Willis et al. | |
| 6,166,452 A * | 12/2000 | Adams et al. | 307/10.1 |
| 6,324,979 B1 * | 12/2001 | Troianello | 102/202.7 |
| 2004/0103811 A1 * | 6/2004 | Okamoto et al. | 102/202.5 |
| 2005/0115434 A1 * | 6/2005 | Avetisian et al. | 102/202.7 |
| 2005/0155509 A1 * | 7/2005 | Matsuda et al. | 102/202.9 |
| 2006/0081146 A1 | 4/2006 | Baginski et al. | |

FOREIGN PATENT DOCUMENTS

| | | |
|---|---|---|
| EP | 1256775 A2 | 5/2002 |
| FR | 2704944 A1 | 5/1993 |
| JP | 2000-108838 | 4/2000 |
| JP | 2000-241098 | 9/2000 |
| JP | 3294582 | 4/2002 |
| JP | 2002535195 T | 10/2002 |
| JP | 2003-205823 | 7/2003 |
| JP | 3118048 | 1/2006 |
| JP | 2006-78101 | 3/2006 |
| WO | 98/28792 A1 | 7/1998 |
| WO | 00/43727 A2 | 7/2000 |

OTHER PUBLICATIONS

International Search Report, PCT/JP2007/070910, dated Nov. 20, 2007.

English Translation of Office Action dated Dec. 14, 2010, in Japanese Patent Application 2006-291301.

* cited by examiner

SQUIB, GAS GENERATOR FOR AIR BAG AND GAS GENERATOR FOR SEAT BELT PRETENSIONER

CROSS-REFERENCE TO RELATED APPLICATIONS

This application claims priority from PCT application PCT/JP2007/070910, filed on Oct. 26, 2007, which is hereby incorporated by reference in its entirety, and this application further claims priority to Japanese Patent Application No. 2006-291301 filed on Oct. 26, 2006.

TECHNICAL FIELD

This invention relates to a squib to be installed in a gas generator or the like for use in a safety device for a car such as an air bag, a seat belt pretensioner, and the like.

More particularly, this invention relates to a gas generator with such a squib installed therein for an air bag, and a gas generator with the squib installed therein for a seat belt pretensioner.

BACKGROUND ART

A variety of electric squibs have been developed as squibs for gas generators for inflating air bags equipped in cars and squibs for micro gas-generators used for seat belt pretensioners.

Such a squib usually has metal pins for electrically connecting to the external, and a heating element at the other ends of the metal pins for igniting an explosive.

As examples of such a heating element, heating elements incorporated in a printed sub-circuit have been known as disclosed in a patent document 1 and a patent document 2 corresponding to the patent document 1.

On the other hand, moreover, it has been contemplated to link an air bag system to a local area network (LAN) to control ignition of a squib by communication.

In this case, it is necessary to locate electric circuits in the squib for the communication and ignition as described in a patent document 3.

With the squib constructed as described above, therefore, it becomes necessary to provide means for causing electric current to flow through the electric circuits built in the squib.

In a patent document 4, for example, disclosed is a structure of an electric circuit board fixed to electrode pins of a closure plug by soldering or the like.

In the method disclosed in the patent document 4, after the circuits have been previously constructed on a board and connected to electrode pins of a closure plug, a resin must be molded around the circuits and the board.

However, particularly the resin molding produced under a condition already connected to a closure plug is seriously lower in productivity as compared with the molding of parts such as a usual IC fixed to a lead frame.

Moreover, in the case that connection between the electrode pins and the electric circuits is firmly fixed by soldering, there would be a risk of solder cracks due to residual stresses.

Patent document 1: Specification of French Patent Application Laid Open No. 2,704,944
Patent document 2: Specification of U.S. Pat. No. 5,544,585
Patent document 3: Official Gazette of Japanese Patent No. 3,294,582
Patent document 4: Specification of European Patent Application Laid Open No. 1,256,775

DISCLOSURE OF THE INVENTION

Task to be Solved by the Invention

As described above, in the case that after electrode pins have been connected to electric circuits by soldering, a resin is molded around these connected members according to the method disclosed in the patent document 4, this process not only lowers the productivity, but also increases anxiety about occurrence of solder cracks due to residual stresses.

In order to solve this problem, it will be envisioned that the resin molding is limited to the region of the electric circuit board, and the connection of electrode pins to electric circuits in the resin molding is effected through connection electrodes provided at the bottom of the resin molding.

With the construction described above, however, the connection between the electrode pins and the electric circuits in the resin molding would be unstable. Moreover, upon operation of the squib, there is a risk that the resin molding will be unfastened and its broken pieces fly in all directions. Even when the resin molding itself does not fly apart, upon impact of the operation of the squib there is a risk of the resin molding being broken up so that its pieces fly in all directions.

The invention effectively solves the problems described above, and has an object to provide a squib ensuring the electric supply to electric circuits built in the squib and enabling a reliable prevention of a resin molding and its broken pieces from flying in all directions upon operation of the squib.

Moreover, the invention has another object to provide a gas generator for an air bag having the squib described above installed in the gas generator, and a gas generator for a seat belt pretensioner having the squib described above installed in the gas generator.

Solution for the Task

Namely, the subject features of the invention are as follows.
(1) A squib including a cup body and a closure plug for holding a plurality of electrode pins insulated from one another and closing the opening of said cup body, and further including, in said cup body, ignition powder and an ASIC component formed by molding a resin around electric circuits having an ASIC and a capacitor, a heating element connected to said ASIC and located at the top of the resin molding of said ASIC component, and connection electrodes located at the bottom of said resin molding for connecting said ASIC to said electrode pins, said squib characterized in comprising a cylindrical metal fixture having at the center of its top an opening of a size sufficient to expose said heating element and being fixed to said closure plug in a state covering the top circumferential periphery and side surface of said ASIC component and pushing said connection electrodes of said ASIC component against said electrode pins.
(2) In the (1) described above, the squib characterized in that said heating element comprises an SCB chip.
(3) A gas generator for an air bag with the squib described in above (1) or (2) installed in said gas generator.
(4) A gas generator for a seat belt pretensioner with the squib described in above (1) or (2) installed in said gas generator.

Effect of the Invention

According to the invention the connection between the electric circuits and the electrode pins is effected with the aid of the elastic force of the cylindrical metal fixture so that the stability of the connection is ensured even when the squib is subjected to severe impact with a great force.

According to the invention, moreover, the cylindrical metal fixture is fixed to the closure plug so as to cover the ASIC component and therefore even upon operation of the squib there is no risk of the ASIC component and its broken pieces flying in all directions.

According to the invention, further, the ASIC component is covered with the cylindrical metal fixture and fixed to the closure plug so that the ignition powder does not break into the connection between the electrode pins and connection electrodes at the bottom of the ASIC component, thereby completely preventing any erroneous ignition of the squib due to noise such as external static electricity.

DESCRIPTION OF THE REFERENCE NUMERALS

1 Cup body
2 Ignition powder
2' Inflammable explosive (secondary charge)
2" Ignition powder composition
3 ASIC component
4 ASIC
5 Capacitor
6 Heating element
7 Connection electrode
8 Closure plug
9 Electrode pin
10 Glass sealing
11 Metal fixture
12 Ignition electrode
13 Mold resin
14 Smaller diameter portion
15 Larger diameter portion
21 Gas generator for air bag
22 Squib
23 Enhancer
24 Gas generating agent
25 Filter
26 Outer case
27 Hole
31 Gas generator for seat belt pretensioner (micro gas-generator)
32 Squib
33 Gas generating agent
34 Base (holder)
35 Cup body
110 Central control unit
111a to 111d Air bag modules
114, 115 Electrode pins

BEST MODE FOR CARRYING OUT THE INVENTION

The invention will then be specifically explained.

Figure 1:
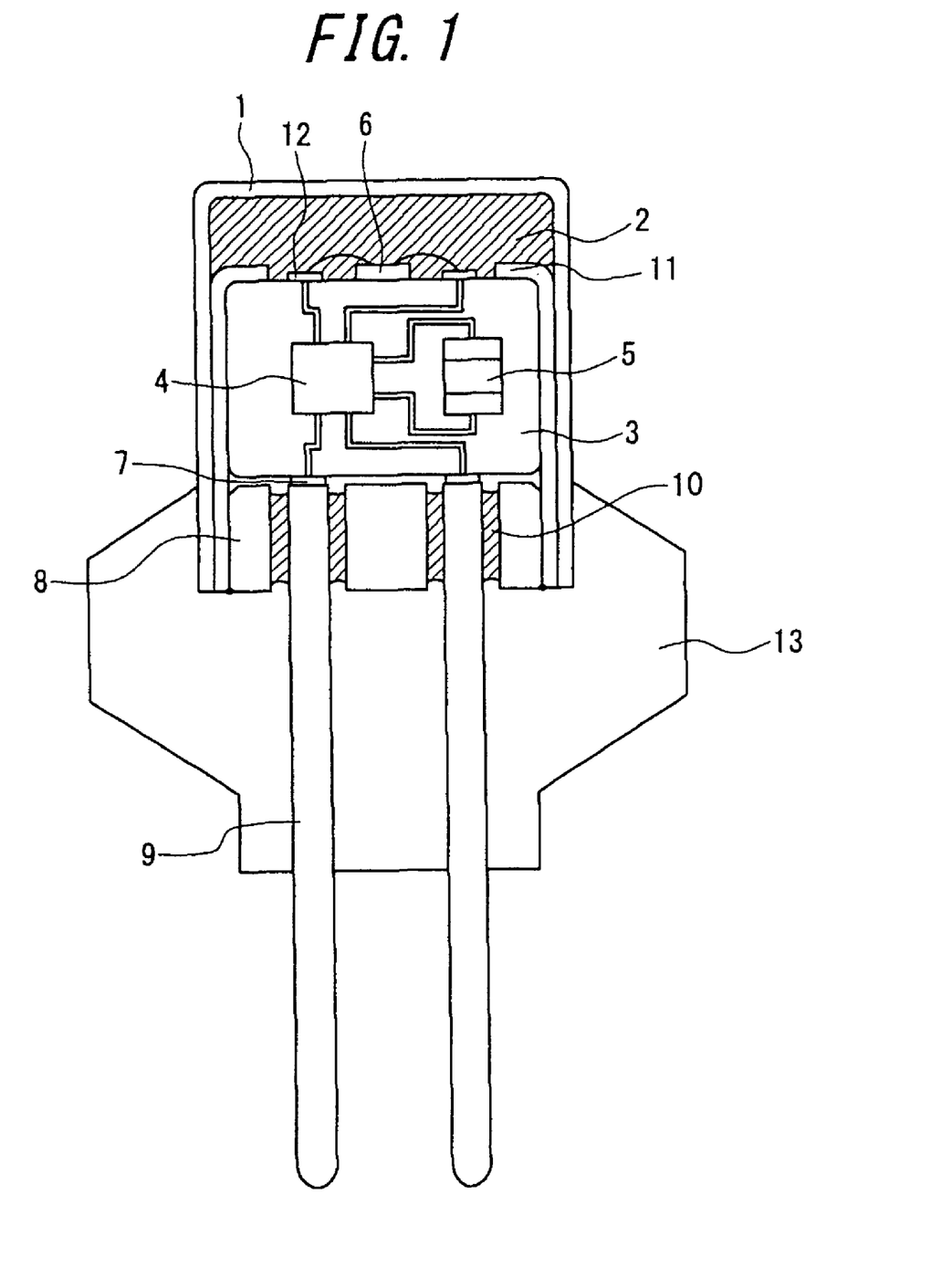
FIG. 1 is a sectional view of a preferable squib according to the invention.

FIG. 1 illustrates in section the squib according to the invention. In the drawing, reference numeral 1 shows a cup body which is usually made of a cylindrical metal body. Reference numeral 2 denotes ignition powder.

Reference numeral 3 denotes an ASIC component which is formed by molding a resin around electric circuits including an ASIC 4, a capacitor 5, and the like. In this place, the ASIC (Application Specific Integrated Circuit) 4 is an integrated circuit for a particular use, which functions as intercommunication switching means in the present invention for igniting the squib based on coded information obtained by intercommunicating with the external. Moreover, the capacitor 5 serves as electric energy-storing means.

Further, reference numeral 6 denotes a heating element arranged on the top of the ASIC component 3, and reference numeral 7 denotes connection electrodes arranged at the bottom of the ASIC component 3.

Moreover, reference numeral 8 shows a metal closure plug to which electrode pins 9 are fixed by means of glass sealing 10 for connecting the electric circuits to the external. The electrode pins 9 are fixed by the glass sealing in this manner to ensure electric insulation while maintaining high gas tightness.

Reference numeral 11 shows a cylindrical metal fixture having an opening at the center of its top.

Figure 2:
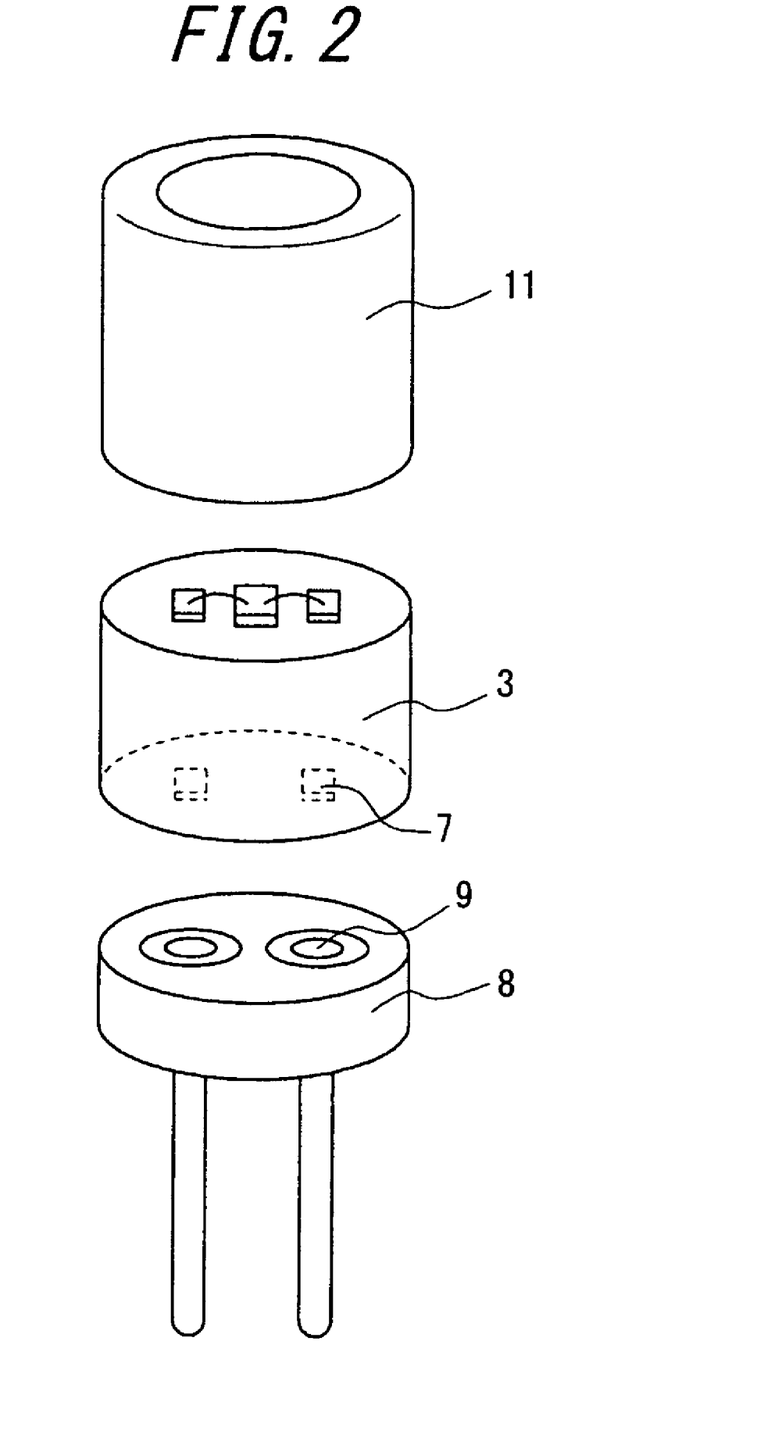
FIG. 2 is an exploded view illustrating a metal fixture, an ASIC component, and a closure plug.

In the present invention, as shown in FIG. 2, the ASIC component 3 and the metal closure plug 8 are superimposed one on the other to bring the connection electrodes 7 into contact with the electrode pins 9. Under this condition, the metal fixture 11 is fitted from the above onto the superimposed ASIC component 3 and metal closure plug 8 and is fixed to the metal closure plug 8 under a condition that the connection electrodes 7 and the electrode pins 9 are forced into contact with each other under pressure. The metal fixture 11 has the opening at the top so as to expose the heating element 6 so that the heating element 6 abuts against the ignition powder 2, whereby the metal fixture does not interfere with the ignition action.

Figure 3:
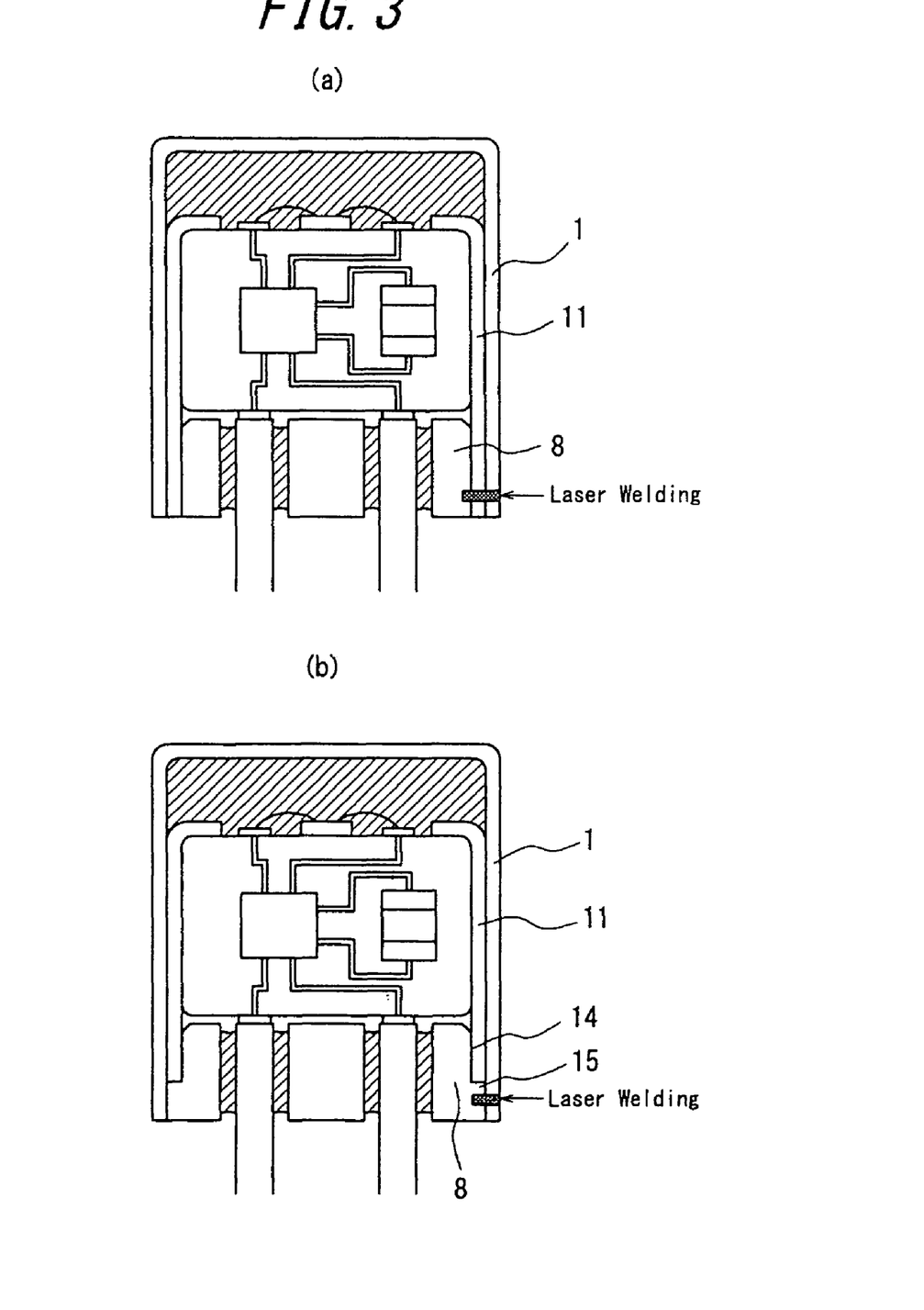
FIG. 3 are views illustrating two fixed states of a metal cup body, the metal fixture, and the closure plug metal portion.

As shown in FIG. 3 (a), moreover, the interior of the cup body 1 is sealed in high gas tightness by fixing the metal cup body 1, the metal fixture 11, and the metal closure plug 8 by welding.

Further, as shown in FIG. 3 (b), preferably the closure plug 8 is provided with a shoulder, and the metal fixture 11 is fixed to the outer surface of the smaller diameter portion 14 of the closure plug 8 formed by the shoulder and thereafter the cup body 1 is fixed to the outer surface of the larger diameter portion and welded thereto. With such a construction, welding surfaces exposed to the exterior become smaller so that the reliability of the gas tightness is more improved.

Figure 4:
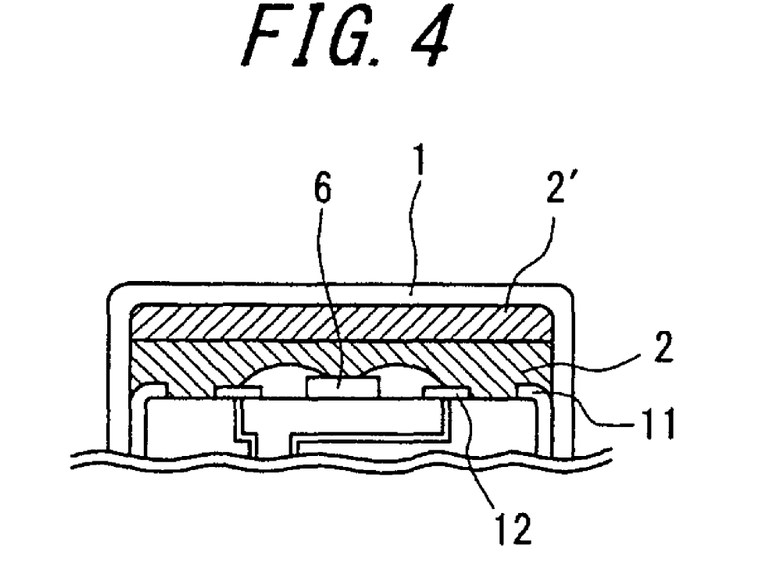
FIG. 4 is an explanatory view of a two-layer structure of ignition powder.

And now, first, the ignition powder 2 is arranged at the innermost portion in the cup body 1 according to the invention. As shown in FIG. 1, the ignition powder 2 may be of one kind of explosive arranged in a single layer, but as shown in FIG. 4, it is more beneficial to arrange inflammable explosive (secondary charge) 2' of stronger in inflammation on the outside of the ignition powder 2 so as to form a two-layer structure.

At this moment, as the inflammable explosive (secondary charge) 2', it is preferable to contain zirconium in its composition. Other than this, those containing titanium hydride, boron or lead trinitroresorcinate are also advantageously suitable.

Moreover, as usable ignition powders 2 other than those described above, there are, for example, those disclosed in the specification of Japanese Patent Application No. 2001-140,468 and the official gazette of Japanese Patent Application Laid Open No. 2002-362,992. Ignition powders are not particularly limited for this purpose. The heating element 6 is arranged so as to be in contact with the ignition powder 2.

A so-called SCB chip as such a heating element 6 is favorably suitable, which makes it possible to ignite the powder with low energy. Moreover, it is more advantageous to make such an SCB chip into the form of a bridge structure by laminating metals and insulators because large sparks occur with low energy. In this place, the "SCB" means a semiconductor bridge which is a heating element produced by the use of manufacturing processes for usual semiconductor integrated circuits.

As the bridge structure described above, a structure formed by alternately laminating titanium and $SiO_2$ (or boron) on a silicone substrate is advantageously suitable. Thicknesses of the respective layers are preferably of the order of 0.05 to 10 μm, and more preferably of 0.1 to 4 μm.

As a bridge structure other than this, it is also possible to apply a structure formed by alternately laminating one or more compositions selected from a group consisting of a nickel chrome alloy, nickel, aluminum, magnesium and zirconium, and one or more compositions selected from a group consisting of calcium, manganese, silicon dioxide and silicone.

Further, an electrical connection of the heating element 6 is effected through ignition electrodes 12 provided on the upper surface of the ASIC component 3.

The ASIC component 3 in the present invention incorporates therein the ASIC 4 as means for the intercommunication and triggering particular electric pulse strings, and the capacitor 5 as means for storing the electric energy.

Moreover, the ASIC component 3 is integrated through the two electrode pins 9 into an air bag system later descried which is linked to a local area network (LAN) and communicating with a central control unit.

Further, it is necessary for the ASIC component 3 to be smoothly inserted into the metal fixture 11 by forming the ASIC component 3 into a cylindrical shape of a size matching with the inner diameter of the cylindrical metal fixture 11. For this purpose, the outer diameter of the ASIC component 3 is preferably of the order of 85% to 99% of the inner diameter of the metal fixture 11.

The diameter of the connection electrodes 7 arranged at the bottom of the ASIC component 3 is preferably somewhat smaller than the diameter of the electrode pins 9 so that even if contact positions of the connection electrodes 7 and the electrode pins 9 are somewhat shifted to each other due to assembling errors or the like, the connection electrodes 7 and the electrode pins 9 can be always maintained in a joined or connected state, thereby enabling the electrical connections between them to be maintained.

It is moreover beneficial that the contact portions of the connection electrodes 7 and the electrode pins 9 are flat to ensure stable contact between them when they are severely pushed to each other.

According to the invention, as described above after the cup body 1 is packed with the ignition powder 2 at the innermost portion of the cup body, the ASIC component 3 and the closure plug 8 integrated in the metal fixture 11 are inserted into the cup body 1 so that the heating element 6 is arranged on the top of the ASIC component 3 abuts against the ignition powder 2. Thereafter, the cup body 1 and the closure plug 8 are connected by welding, thereby integrating the whole assembly.

According to the invention, therefore, as described with reference to FIG. 2, under the condition of the connection electrodes 7 in contact with the electrode pins 9 under pressure, the metal fixture 11 is fixed to the closure plug 8. In other words, under the condition of the ASIC component 3 interposed between the metal fixture 11 and the closure plug 8, the closure plug 8 is forced into the metal fixture 11 with a pressure more than a predetermined pressure and fixed to the metal fixture 11. Therefore, even when the squib is impacted with a great force, the connection between the connection electrodes 7 and electrode pins 9 is never cut off.

Moreover, since the ASIC component 3 is fixed by the metal fixture 11, upon operation of the squib the ASIC component 3 and its broken pieces are effectively prevented from flying in all directions.

In this place, the pushing force of the closure plug 8 against the metal fixture 11 is preferably of the order of 1 to 250 MPa. If the pushing force is less than 1 MPa, a pushing force sufficient to join the connection electrodes 7 and the electrode pins 9 is not obtained, while if the force is more than 250 MPa, the stress applied to the ASIC component becomes too large so that there is a risk of breakage of the ASIC component. The more preferable force for press-fitting is within the range of 2 to 130 MPa.

By employing the preferable press-fitting force, the connection electrodes 7 are connected to the electrode pins 9 with the sufficient pushing force with the aid of an elastic force of the metal fixture 11.

Figure 5:
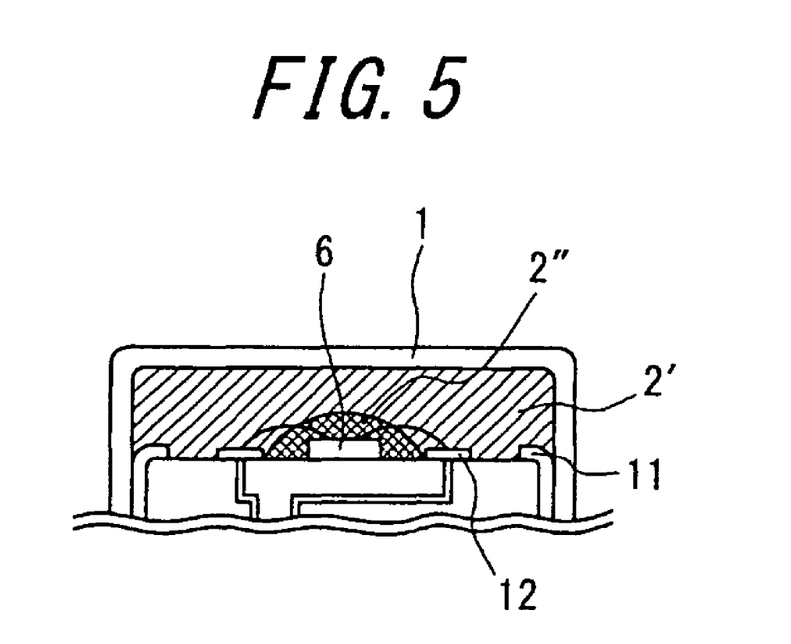
FIG. 5 is an explanatory view of a heating element of the upper surface coated with ignition powder composition.

As shown in FIG. 5, according to the invention the upper surface of the heating element 6 may be previously coated with the ignition powder composition 2". In other words, the ignition powder in a slurry state is dispensed or applied to the upper surface of the heating element 6 and then dried. As compared with the case that the ignition powder in a powder state is merely packed, the coated and dried ignition powder composition 2" is more stable in the contact with the heating element to effectively contribute to the reliable ignition and shortening of the ignition time.

Moreover, according to the invention a protecting cup (not shown) made of a resin may be provided about the metal cup body 1 so as to cover the cup body 1 so that an insulating performance for the metal cup body 1 from the external can be ensured. Further, after the closure plug 8 is press-fitted in the cup body 1, a resin 13 may be molded around that portion.

With the squib according to the invention, the ASIC component 3 can be arranged in the closure plug 8 and the cup 1 which are held in a gas tight state, and further the electrical connection between the connection electrodes 7 and the electrode pins 9 can be kept by the contact between them, so that although the ASIC component 3 is loaded in the squib, the overall size of the squib 1 can be kept nearly to the sizes of prior art squibs.

Moreover, the squib according to the invention can communicate with the exterior (for example, a central control unit) by the use of the ASIC 4 as intercommunication switching means and the capacitor 5 as electric energy-storing means both built in the ASIC component 3.

Accordingly, if such a squib described above is used in each of air bag modules, for example, incorporated in a car and connected to a central control unit through an air bag system linked to a local area network (LAN), it becomes possible for the central control unit to ignite only a required air bag module upon collision, while particular electric energy for igniting such a squib need no longer be transmitted.

These functions and effects are achieved especially by providing the capacitor 5 in each of squibs for storing faint energy contained in voltage signals generated from the central control unit, using the SCB chip as the heating element 6 which causes ignition powder to be ignited with lower energy than those with the prior art, and providing the ASIC 4 as intercommunication and switching means which detects coded information transmitted from the central control unit and in turn transmits command for sending the state of the squib.

In the invention, moreover, the term "coded information" used in the intercommunication with the central control unit is intended to mean both the information including a command for igniting each of the squibs and the information concerning states of electronic elements included in each of the squibs to be transmitted to the central control unit.

A gas generator for an air bag using the squib according to the invention will then be explained.

Figure 6:
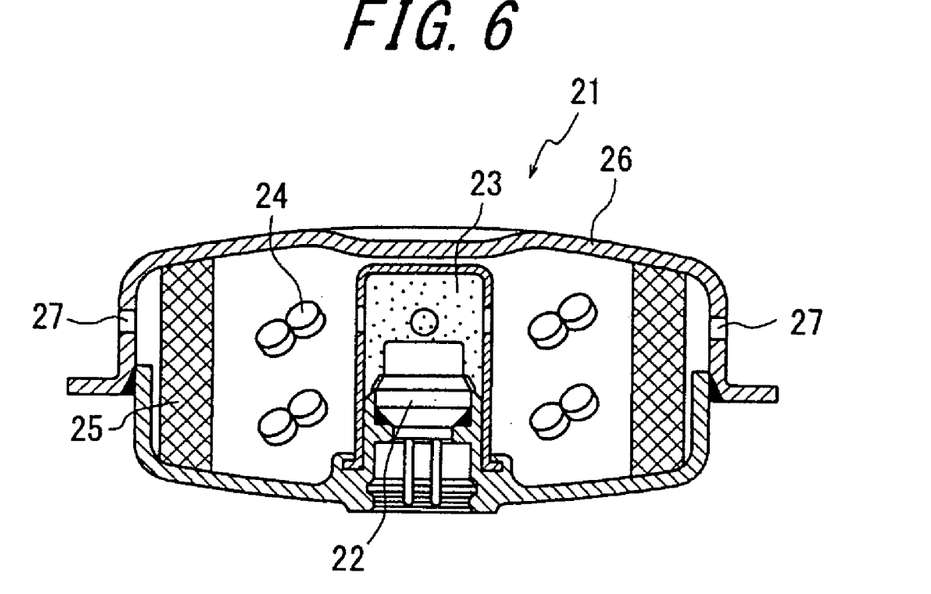
FIG. 6 is a conceptual view of a gas generator for an air bag.

FIG. 6 is a conceptual view of a gas generator for an air bag. As shown in FIG. 6, the gas generator 21 for the air bag comprises therein a squib 22, an enhancer 23, gas generating agent 24, and filters 25, and outside the gas generator an outer case 26 withstanding the pressure when the gas generating agent 24 is burned. The outer case 26 is formed with holes 27 for discharging the generated gas into the air bag.

When the squib 22 is actuated, the enhancer 23 burns by heat energy produced from the squib 22 to generate flame and thermal particles by means of which the gas generating agent 24 is burned to generate a gas for inflating the air bag. The generated gas is discharged out of the outer case 26 through the holes 27 formed in the outer case 26. At this time, the gas passes through the filters 25 so that residues of the burned gas generating agent are collected at the filters and the gas itself is cooled simultaneously.

Although the squib according to the invention includes the communication circuit comprising the ASIC, the squib is similar in size to the prior art squibs as described above. Therefore, the gas generator for an air bag using the squib according to the invention is effectively compact and has a size almost similar to sizes of prior art gas generators.

Moreover, a gas generator for a seat belt pretensioner using the squib according to the invention will be explained.

Figure 7:
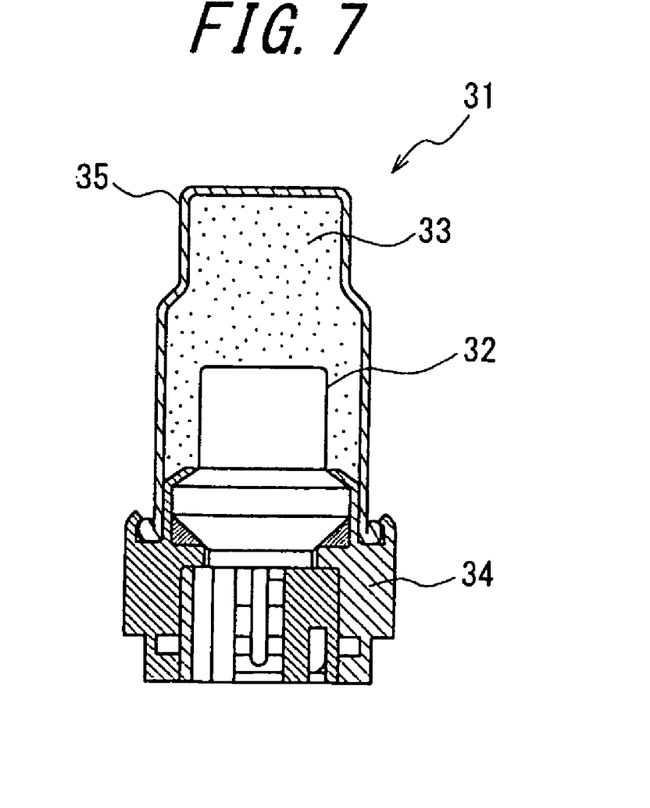
FIG. 7 is a conceptual view of a gas generator for a seat belt pretensioner.

FIG. 7 is a conceptual view illustrating the gas generator (micro gas-generator) for a seat belt pretensioner. As shown in FIG. 7, the micro gas-generator 31 comprises therein a squib 32 and a gas generating agent 33. The squib 32 is fixed to a base 34 called a holder. Further, a cup body 32 for storing a gas generating agent 33 therein is also fixed to the holder by means of, for example, crimping. When the squib 32 is actuated, the gas generating agent 33 in the cup body 35 is burned by the flame and thermal particles coming from the squib 32 to generate a gas.

The squib according to the invention is compact, although it has the communication circuit comprising the ASIC as described above. Therefore, by using the squib, it is also possible to provide the micro gas-generator which is compact and has a size almost similar to sizes of the prior art gas generators.

The igniting operation of the squib according to the invention will then be explained.

Under a normal condition, that is, for example, when a car does not encounter any accident requiring the development or inflation of an air bag having the squib 1 incorporated therein, the capacitor as electric energy-storing means is under a condition storing the energy contained in communication signals sent from the central control unit.

Here, when the squib is requested to operate by impact caused by an accident or the like, the central control unit transmits an ignition command in the form of a particular electric pulse string to the ASIC component 3 in the squib. In the ASIC component, at this moment the stored electric energy is discharged from the capacitor 5 to the heating element 6 by means of the electronic switch. The heating element 6 causes the ignition powder 2 to start its ignition with the aid of the electric energy from the capacitor 5.

Figure 8:
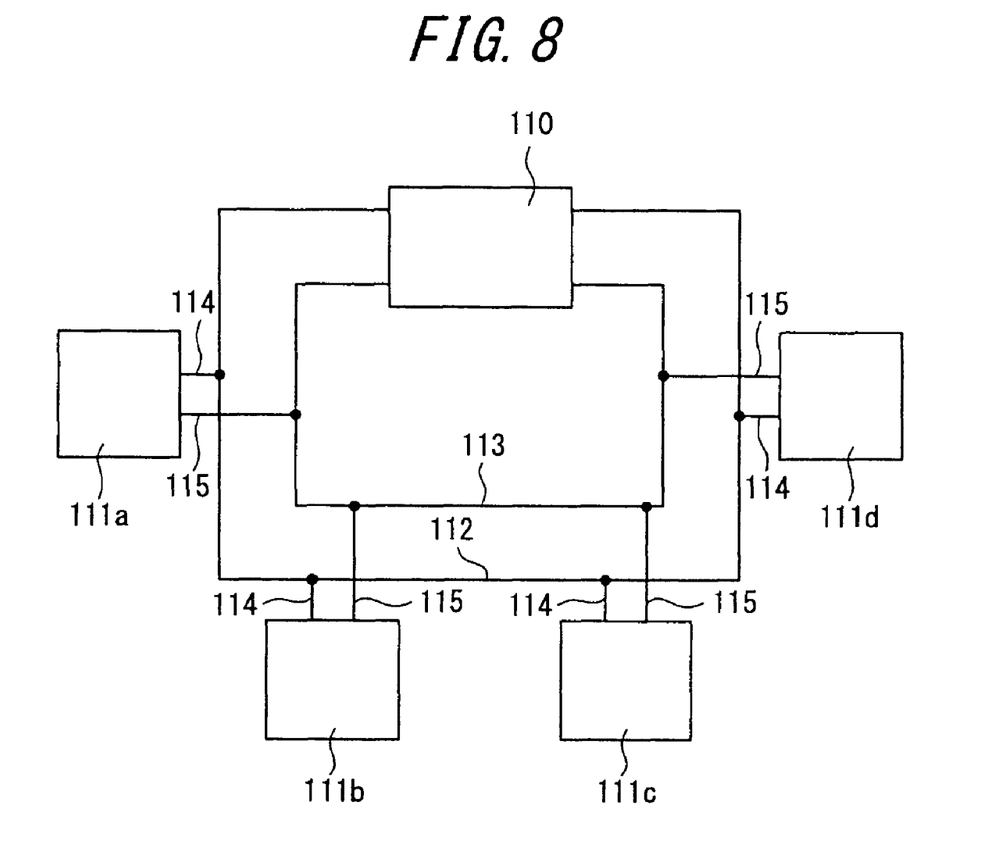
FIG. 8 is an explanatory view of a central control unit.

The control procedure by the central control unit will then be explained. FIG. 8 illustrates an example of the air bag system linked to a local area network (LAN) and connected with the central control unit 110 and four air bag systems 111*a*, 111*b*, 111*c* and 111*d*. The two air bag modules 111*b* and 111*c* each may have a gas generator for inflating, for example, a front air bag, while the other two air bag modules 111*a* and 111*d* each may have a gas generator for inflating, for example, a side air bag.

The squib is put in the gas generator included in each of these modules. Each of the squibs has two electrode pins 114 and 115, the former electrode pin 114 being connected to a first electric-supply conductor 112 connected to the central control unit 110, and the latter electrode pin 115 being connected to a second electric-supply conductor 113 connected to the central control unit 110.

Under a normal condition, that is, when a car does not encounter a particular accident requiring activation of one or more air bag modules 111*a*, 111*b*, 111*c* and 111*d*, the central control unit 110 periodically gives the electric-supply conductors 112 and 113 low electric current which is fed through the electrode pins 114 and 115 to the electric energy storing means (capacitors) of the squibs included in the four air bag modules 111*a*, 111*b*, 111*c* and 111*d*, respectively.

In the event that for example, upon impact, the activation of the air bag module 111*c* is desired, the central control unit 110 feeds a particular electric pulse string constituting an ignition command for the squib of the air bag module 111*c* to the first electric-supply conductor 112. Although the particular electric pulse string is fed to each of the squibs through the electrode pins 114 and 115, only the intercommunication means included in the squib of the air bag module 111*c* responds to the command to activate the electric energy-storing means associated with the ignition switching means, thereby activating the ignition powder in the manner described above.

Following the impact, if it is desired to activate some air bag modules, for example, the air bag modules 111*a* and 111*b*, the central control unit 110 gives the first electric-supply conductor 112 a particular electric pulse string for each of the squibs included in the air bag modules 111*a* and 111*b*, respectively. The two squibs operate in the same manner as described above.

What is claimed is:

1. A squib, comprising:
   (a) a cup body having an opening;
   (b) a closure plug closing said opening of said cup body and holding a plurality of electrode pins which are insulated from one another;
   (c) ignition powder in said cup body;
   (d) an application specific integrated circuit (ASIC) component comprising electric circuits including an ASIC and a capacitor;
   (e) a resin molding around said ASIC component and located in said cup body with ignition electrodes on a top of said resin molding electrically connected to said ASIC and connection electrodes on a bottom of said resin molding electrically connected to said ASIC;
(f) a heating element,
 (i) located at a top of said resin molding,
 (ii) electrically connected to said ignition electrodes and
 (iii) abutting against said ignition powder; and
(g) a cylindrical metal fixture intermediate said cup body and said resin molding having a first opening at a center of a top portion thereof, said first opening being of a size sufficient to expose said heating element,
 (i) said cylindrical metal fixture having a second opening at a flat, bottom portion thereof, said closure plug being fitted in said second opening,
 (ii) said cylindrical metal fixture further covering a top circumferential periphery and complete side surface of said resin molding therein, and
 (iiii) said cylindrical metal fixture said second opening further being closed by said closure plug with said connection electrodes in electrical press-contact with said electrode pins at the bottom of said resin molding.

2. The squib as claimed in claim 1, characterized in that said heating element comprises an SCB chip.

3. A gas generator for an air bag with the squib claimed in claim 2 installed in said gas generator.

4. A gas generator for a seat belt pretensioner with the squib claimed in claim 2 installed in said gas generator.

5. A gas generator for an air bag with the squib claimed in claim 1 installed in said gas generator.

6. A gas generator for a seat belt pretensioner with the squib claimed in claim 1 installed in said gas generator.

* * * * *